United States Patent

[11] 3,593,577

| [72] | Inventor | Ray J. Monner<br>Moline, Ill. |
|---|---|---|
| [21] | Appl. No. | 723,222 |
| [22] | Filed | Apr. 22, 1968 |
| [45] | Patented | July 20, 1971 |
| [73] | Assignee | Parr Instrument Co..<br>Moline, Ill. |

[54] ADIABATIC CALORIMETER CONTROL SYSTEM
8 Claims, 3 Drawing Figs.

[52] U.S. Cl. ................................................. 73/190 R
[51] Int. Cl. ................................................. G01k 17/00
[50] Field of Search ........................................... 73/209,
190; 390/233

[56] References Cited
UNITED STATES PATENTS

| 2,908,829 | 10/1959 | Schaeve | 307/88.5 |
| 3,315,892 | 4/1967 | Haake | 73/204 |

FOREIGN PATENTS

| 121,966 | 12/1958 | U.S.S.R. | 340/233 |

Primary Examiner—Richard C. Queisser
Assistant Examiner—Herbert Goldstein
Attorney—Wilson & Geppert ABSTRACT: A control system utilized for an adiabatic calorimeter including a pair of thermistors positioned in the bucket and the jacket of a calorimeter and connected to an off-null electrical bridge circuit that actuates one of two relays controlling the flow of hot and/or cold water to the calorimeter jacket. A signal from the bridge indicating an imbalance in the thermistor temperatures is amplified in two stages and fed to a thyristor. Depending on the phase of the signal, one relay will be actuated while the other relay is blocked; one relay controlling the addition of small amounts of hot or cold water and the other relay controlling the addition of a large amount of hot water when the sample in the calorimeter is ignited.

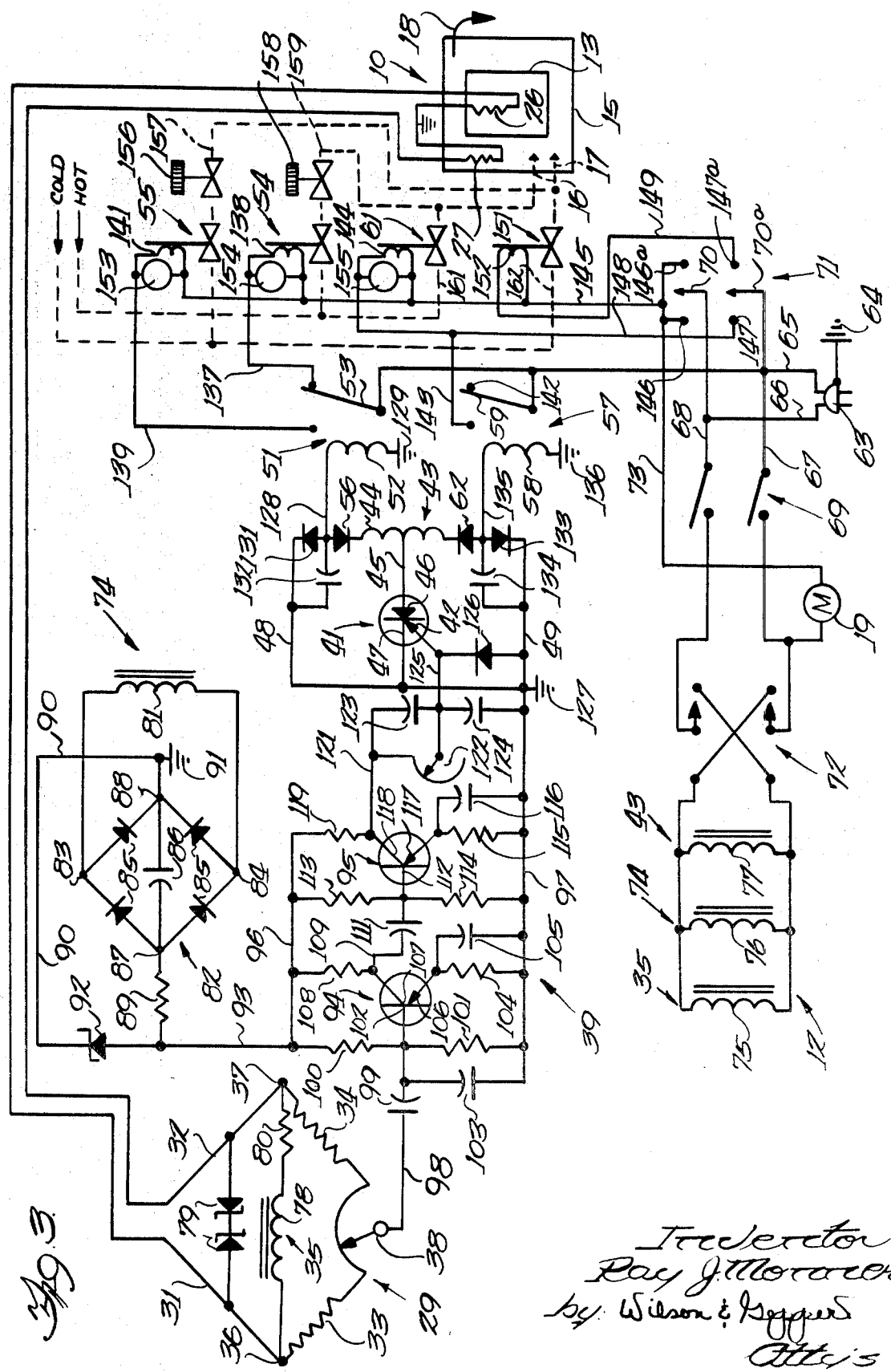

3,593,577

1

ADIABATIC CALORIMETER CONTROL SYSTEM

The present invention relates to a control system utilized in an adiabatic calorimeter and more particularly to a control system for adjusting the waterflow for the jacket of the calorimeter as sensed by thermistors in the calorimeter jacket and bucket.

Essential to the operation of an adiabatic calorimeter is provision for adjusting the temperature of the surrounding jacket to match at all times the temperature of the calorimeter proper, thus preventing energy transfer to or from the calorimeter. This is usually accomplished by adding hot or cold water to the jacket as required to maintain equilibrium. Manually operated water valves have been used with moderate success; however, the operator is required to remain at the instrument during a determination and a high degree of skill is required to obtain consistent results.

Automatic systems have been devised to maintain adiabatic conditions in the calorimeter, and the obvious advantages of an automatic system are that the operator is free to perform other work during a determination and uniformity of results is not dependent on operator skill.

Conventional null circuits have been in use for many years in various measuring and control systems; however, an inherent disadvantage of a null system is the decrease in signal strength as null is approached with no signal at null. The signal gradually appears in reverse as null is passed. Thus, there is a dead zone in which no corrective action is possible. It is customary to use some form of amplification to narrow the dead zone and provide sensitivity; however, excessive amplification, introduces undesirable effects, such as instability and disturbances from outside sources, consequently null circuits become costly and delicate where sensitivity is required. The present invention utilizes an off-null circuit which obviates the above disadvantages of the null circuit.

Among the objects of the present invention is the provision of a control system having an off-null circuit which provides positive on-off control with a very small signal change through the use of a thyristor in the form of a silicon-controlled rectifier that can be considered as a bistable switch. There is no problem of the disappearing signal as in a null system because at the control point the signal is strong and varies in a predictable manner. The silicon-controlled rectifier latches and releases at a definite value providing full on or full off driving power to the control system.

Another object of the present invention is the provision of a control system requiring only moderate amplification of the signal with resultant stability. The simplicity of the circuit results in low cost, durability and manufacturing ease. In addition to excellent sensitivity and stability in the equilibrium mode, the circuit offers the advantage of providing control action on either side of null with equal accuracy. Thus, it is possible to provide several modes of operation with only two circuit loops.

A further object of the present invention is the provision of a solid-state, off-null control circuit which eliminates the galvanometer and the problems it introduces in the bridge circuit. THe circuit operates with a strong signal at all times instead of depending upon a progressively disappearing signal. With the galvanometer eliminated, there is no mechanical inertia and the controller can take corrective action immediately without lag or overshoot. Maintenance is reduced to practically zero since there are no moving parts or critical adjustments to be made after the unit is installed.

The present invention also comprehends the provision of a control system which will accept any variable that can be converted into an electrical signal, such as resistance, voltage, temperature, etc. THe system will amplify the signal in a stable manner and use it to perform corrective action.

The present invention further comprehends the provision of a control system which will perform the corrective action in a repeatable manner, essentially independent of outside influences such as temperature change, line voltage fluctuations, stray magnetic fields, transients, microphonics, etc.

Another object of the present invention is the provision of a control system which is rugged and capable of operating indefinitely without attention. The components are readily obtainable and the system can be built and used by relatively inexperienced personnel. The system controls about a set point with high sensitivity; which set point may be variable such that the controlled medium can follow the varying set point rapidly and with high accuracy.

Another object of the present invention is the provision of a control system which uses null balance control with the high sensitivity and driving force obtained only by an off-null position. The system is always offset from a null position by a definite and repeatable value to provide excellent null balance of the controlled variable.

Further objects are to provide a construction of maximum simplicity, efficiency, economy and ease of assembly and operation, and such further objects, advantages and capabilities as will later more fully appear and are inherently possessed thereby.

In the drawings:

FIG. 3 is a complete wiring assembly for the control system.

Figure 1:
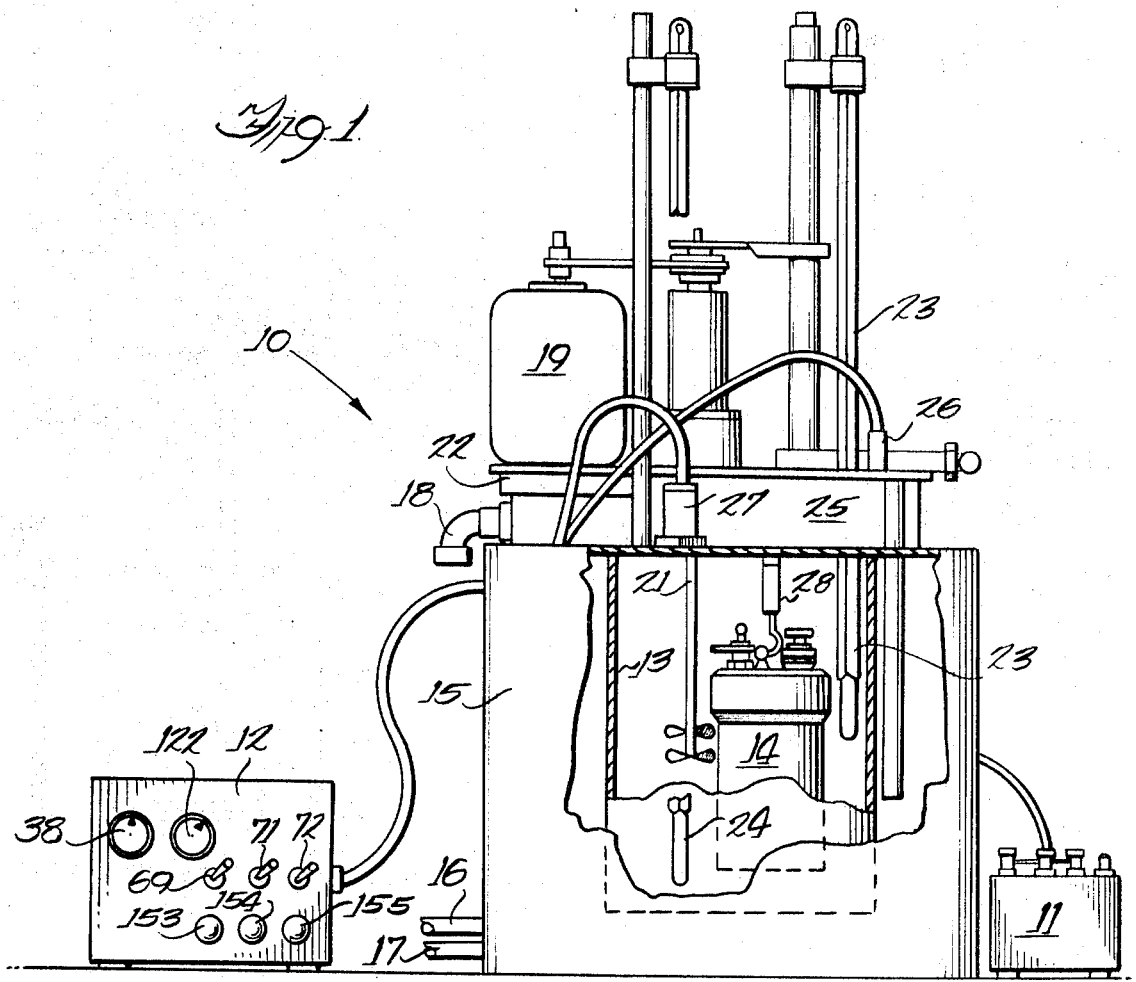
FIG. 1 is an illustrative side elevational view partially in cross section of an adiabatic calorimeter utilizing the control system of the present invention.

Referring more particularly to the disclosure in the drawings wherein is shown an illustrative embodiment of the present invention, FIG. 1 discloses an adiabatic calorimeter 10 having an ignition or firing means 11 and a control system 12. THe calorimeter 10 may be of any suitable type and is preferably an oxygen bomb calorimeter. As is well known, the calorimeter 10 includes a bucket 13 for the oxygen bomb 14 mounted within a jacket 15 surrounding the bucket and hot and cold water inlets 16 and 17 and a drain outlet 18. A motor 19 rotates a stirrer 21 in the bucket 13 having a fixed quantity of water therein, and a pump 22 mounted in the jacket 15.

A bucket thermometer 23 and a jacket thermometer 24 extend through the cover 25 for the jacket 15 and into the bucket and jacket, respectively. The cover 25 also receives the water circulating therein as does the jacket 15. A bucket thermistor 26 is located adjacent the bulb of the bucket thermometer and a jacket thermistor 27 is similarly located relative to the jacket thermometer. The oxygen bomb 14 has a suitable check valve connection for a supply of oxygen, and a connection 28 to the ignition or firing means 11 for the sample in the bomb.

The control system 12 has been devised to maintain adiabatic conditions in the calorimeter 10. The requirements of a calorimeter control system are:

1. Transducers in the bucket and jacket to sense temperature imbalance and to initiate corrective action.
2. A means for admitting to the jacket small amounts of hot and cold water to maintain balance during the equilibrium period before the sample is burned in the calorimeter.
3. A means for admitting to the jacket large amounts of hot water during the rapid temperature rise period after the sample is burned in the calorimeter.
4. Quick sensing and fast accurate control during the rapid temperature rise period.
5. After the rapid temperature rise period, the system shall again establish equilibrium at a new and higher temperature; all of the above actions taking place without attention from the operator.

Figure 2:
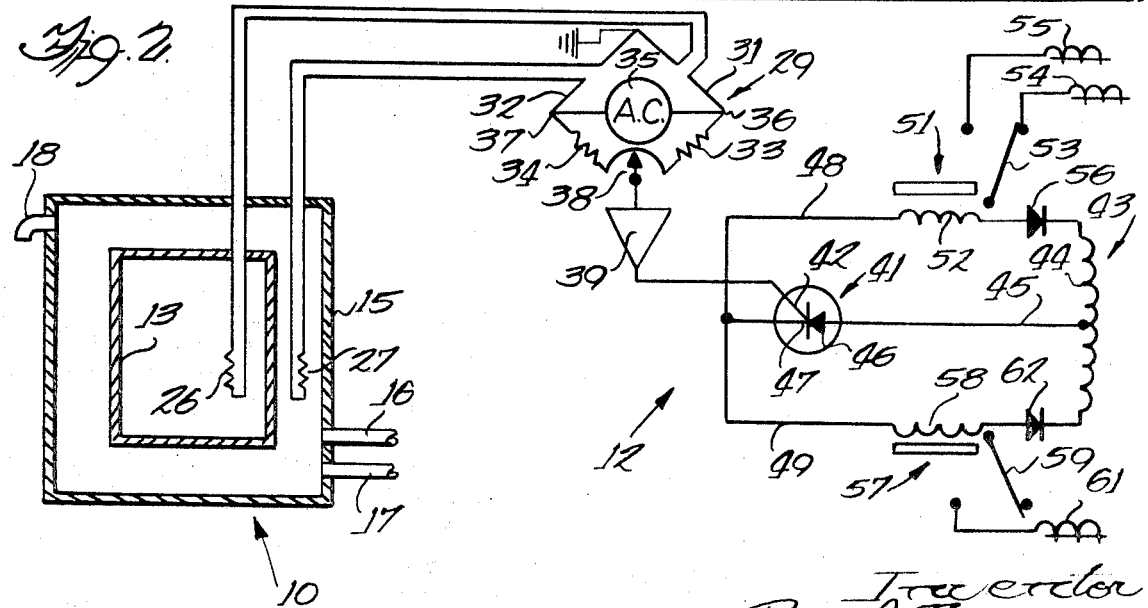
FIG. 2 is an illustrative schematic showing of the control system.

The thermistors 26 and 27 are connected to a bridge circuit 29 of the control system 12; the system being schematically shown in FIG. 2 and more specifically shown in FIG. 3. COnsidering the simplified showing of the control system in FIG. 2, the thermistors 26 and 27 are connected in the legs 31 and 32, respectively, of the bridge 29. The other two legs include resistors 33 and 34 which are preferably equal in value. An alternating current bias supply 35 is connected across the contacts 36 and 37 of the bridge to provide the power for a signal, and a balance control or potentiometer 38 is provided at the intersection of the legs containing resistors 33 and 34.

An amplifier 39 is connected to and receives and amplifies any signal from the bridge 29 and feeds the signal to the gate 42 of a silicon-controlled rectifier or thyristor 41. A transformer 43 has a winding 44 with center tap 45 connected to the anode 46 of the thyristor 41 and a cathode 47 is connected to a pair of loops 48 and 49 leading back to the ends of the winding 44. The upper loop 48 includes a coil 52 of a relay 51 having a switch arm 53 adapted to actuate a small hot waterflow solenoid 54 or a small cold waterflow solenoid 55. A diode 56 is located in the loop 48 between the relay 51 and the winding 44.

Similarly, the lower loop 49 includes a coil 58 of a relay 57 actuating a switch arm 59 for a large hot waterflow solenoid 61, the loop also having a diode 62. The diodes 56 and 62 are located in the loops in opposition to each other as seen in FIG. 2.

COnsidering operation of the system, an alternating current bias supply is applied to the bridge 29 via the transformer 35, and the balance control 38 is adjusted to an off-null position. A signal will be generated by the bridge 29 only if a condition of imbalance exists in the resistance of the two thermistors 26 and 27, the phase of the signal determined by the direction of imbalance. The resistance of a thermistor is a function of its temperature; as the temperature increases the resistance becomes less in a predictable manner and vice versa. This AC signal is amplified by the amplifier 39 and fed to the gate 42 of the thyristor 41. If the signal is in phase with the upper loop 48 as generated by the transformer 43, the relay 51 will pull in when the thyristor 41 fires and the diode 62 will block current to relay 57. If an imbalance exists in the opposite direction, the phase of the signal will shift 180° and be in phase with the lower loop 49; thereby activating the relay 57 with the diode 56 blocking current to relay 51.

More specifically, the balance control 38 is adjusted to simulate the condition which would exist if the jacket thermistor 27 is slightly warmer than the bucket thermistor 26. The relay 51 is normally in the position of allowing a small flow of hot water into the jacket 15. With the imbalance between the thermistors 26 and 27, a signal is generated which activates relay 51 allowing a small flow of cold water through solenoid valve 55 to enter the jacket 15. The incoming cold water drives the system back toward a balanced condition wherein the signal is reduced causing relay 51 to drop out stopping the flow of cold water. When the relay 51 drops out, the back contacts make up with switch arm 53 actuating solenoid valve 54 to allow a small flow of hot water to enter the jacket driving the system back to the first simulated condition. This system alternates between small cold waterflow and small hot waterflow causing the jacket temperature to oscillate above and below the bucket temperature by approximately 0.001°C.

However, when the bucket temperature is increased suddenly by a large amount as in the rapid rise period following ignition or firing of the sample, the small flow of hot water supplied by relay 51 will not be sufficient to match the rapidly rising bucket temperature, and the bridge will be driven toward its balance point where no signal is produced and on to the opposite side of the bridge where a signal will be generated in opposite phase. After amplification, this opposite signal will trigger the thyristor 41 in phase with the loop 49 containing the relay 57. Activation of relay 57 introduces a large flow of hot water through solenoid valve 61 to the jacket 15. The temperature imbalance needed to actuate relay 57 is approximately 0.02°C. This condition continues as long as the large demand exists, after which the bridge 29 returns to equilibrium at a higher temperature.

Now considering the more complete wiring diagram of the control system 12 shown in FIG. 3, a source of 115 volt alternating current is shown as a three-wire plug 63 having a ground 64. One wire 65 from the plug intersects a lead 67 and also is connected to the switch arms 53 and 59 of the relays 51 and 57, respectively. The other wire 66 intersects the lead 68; the leads 67 and 68 connected to a double-pole single-throw on-off switch 69 and to the switch arms 70, 70ª of a double-pole double-throw manual control switch 71. From the switch 69, the leads 67, 68 extend to a double-pole double-throw phase switch 72, with a branch line 73 connected to the motor 19 for the calorimeter 10 and extending from the motor 19 to a pair of poles 146, 146ª of the switch 71. From the phase switch 72, the leads 67, 68 extend to the primary windings 75, 76 and 77 of the stepdown transformers 35, 74 and 43 connected in parallel.

The secondary winding 78 of transformer 35 is located between the points 36 and 37 of the bridge 29, and a pair of opposed diodes 79, 79 are connected across the legs 31 and 32 of the bridge. The diodes 79, 79 together with the resistor 80, in series with the secondary winding 78, forms a Zener voltage regulator to keep the bias on the bridge 29 at exactly 6 volts AC regardless of line voltage fluctuations. The secondary winding 44 of the transformer 43 is located across the loops 48 and 49 of the relay-actuating circuit, while the secondary winding 81 of the transformer 73 is connected across the points 83, 84 of a monolithic diode bridge 82 which converts 12.6 volts AC into pulsating direct current. The diode bridge 82, as is well known, has four identical diodes 85, one in each leg of the bridge 82. A capacitor 86 is connected across the opposite two points 87, 88 of the bridge to smooth the pulsating direct current to a steady direct current with the capacitor 86 connected in series with a resistor 89. A loop 90 intersects the end of resistor 89 and the point 88 and is grounded at 91; the loop containing a diode 92; the diode 92 and resistor 89 forming a Zener voltage regulator used to hold the amplifier supply at exactly 12 volts DC regardless of line voltage variation. Thus, the amplifier gain remains constant and free of line transients. A line 93 leads from the intersection of the loop 90 with resistor 89 to the amplifier 39.

The amplifier circuit 39 is a two-stage amplification utilizing a pair of transistors 94, 95. A pair of parallel lines 96, 97 are connected to line 93; and the line 98 from the balance control 38 having a capacitor 99 therein intersects the line 93 between the resistors 100 and 101, and proceeds to the base 102 of transistor 94. A capacitor 103 is connected in parallel with the resistor 101. A resistor 104 and a capacitor 105 in parallel extend between line 97 and the emitter 106 of the transistor 94, and a resistor 108 extends between the collector 107 and line 96. A line 109 containing a capacitor 111 extends from the collector 107 to the base 112 of the second transistor 95. A resistor 113 extending from line 96 and a resistor 114 extending from line 97 intersect the line 109 beyond the capacitor 111.

A resistor 115 and a capacitor 116 in parallel extend from line 97 to the emitter 117 of transistor 95, and a resistor 119 extends between the collector 118 of the transistor 95 and line 96. A line 121 from the emitter 118 leads to a variable resistor 122 and a capacitor 123 in parallel, and a capacitor 124 is in series with the resistor 122 and capacitor 123 and intersects the line 97. The variable resistor 122 is a feedback control to provide separation between the two phase loops 48 and 49 containing the relays 51 and 57, respectively. This resistor is set so that the thyristor 41 activates relay 51 or relay 57, but it will not activate both at once. In this way, a differential is provided between low-flow hot water and high-flow hot water. This zone is kept as small as possible without causing instability.

A line 125 from the resistor 122 leads to the gate 42 of the thyristor 41, while a diode 126 is located between the line 97 and the gate 42 to prevent negative voltage from appearing across the thyristor gate thus preventing reverse triggering. The thyristor 41 acts as a rectifier diode and a switch in that no current ever flows in a backward direction and current flows in a forward direction only when voltage is applied to the gate. The loops 48 and 49 are grounded at 127, while the line 97 intersects the ground 127.

On one side of the secondary winding 44 of transformer 43 is the diode 56 with the line 128 to the coil 52 of relay 51 grounded at 129. A diode 131 is located in loop 48 because the relay coil 52 constitutes an inductive load which can feed oscillations back into the circuit loop and possibly cause false operation of the thyristor 41. A capacitor 132 in parallel with diode 131 is used to smooth the pulsating DC applied to the relay coil 52, otherwise the relay would chatter. Similarly the diode 62 is paired with a diode 133 and a capacitor 134; the diode 133 and capacitor 134 functioning in the same manner as diode 131 and capacitor 132. A line 135 from between the diodes leads to the coil 58 of relay 57; the coil being grounded at 136.

A line 137 from the normally closed contact of the relay 51 extends to the coil 138 of the solenoid valve 54, and a line 139 from the normally open contact of relay 51 extends to the coil 141 of solenoid valve 55. The relay 57 has a normally closed contact 142 that is not connected, and a line 143 extends from the normally open contact of relay 57 to the coil 144 of the solenoid valve 61. The coils 138, 141 and 144 are all connected to a line 145 intersecting branch line 73 at the switch 71; the line 73 extending to the contacts 146, 146$^a$ for one switch arm 70. A line 148 extends from the pole 147 of switch 71 to intersect the line 143, and a line 149 extends from the pole 147$^a$ to the coil 152 of the full cold waterflow solenoid valve 151, the opposite end of the coil intersecting line 145.

A white pilot light 153 is connected in parallel with coil 141, an amber pilot light 154 is connected in parallel with the coil 138, and a red pilot light 155 is connected across the coil 144. A manual control valve 156 is connected in the low cold waterflow line 157, and a manual valve 158 is located in the low hot waterflow line 159, the valves 156 and 158 controlling the low-flow rates. The full hot waterflow line 161 and full cold waterflow line 162 do not require any manual adjustment valves.

The control circuit operates as previously described for the simplified schematic circuit of FIG. 2 with the amplifier circuit 39 having the two transistors 94, 95 providing a two-stage amplification of the signal from the bridge 29 and feeding the signal to the thyristor 41, and the diodes 56, 131 and 62, 133 blocking one relay when the other relay is activated. After the measurement has been taken, the calorimeter can be quickly brought down to starting temperature by utilizing the manual control switch 71. The switch arms 70, 70$^a$ are moved to contact the poles 146$^a$, 147$^a$ which completes a circuit through lines 149, 145 to the coil 152 of the full cold waterflow solenoid valve 151. If the switch 71 is moved in the opposite direction so that switch arms 70, 70$^a$ contact poles 146, 147, a circuit is completed through lines 148, 143 and 145 to manually actuate the coil 141 of the full hot waterflow solenoid valve 61.

While the improvement has been shown and described as being advantageously applicable to an adiabatic calorimeter, it is not my desire or intent to unnecessarily limit the scope or the utility of the improved control system by virtue of this illustrative embodiment. This circuit can be used to drive components other than the solenoid water valves shown; it is therefore equally applicable as a precise temperature controller for electric heaters, ovens and water baths. The extreme sensitivity and stability of the circuit adapt it for use in high-precision electric thermometry; and in a broad sense, this system can be used with any electrical system or device to provide a strong signal at a balance point to replace the commonly used arrangements which produce no signal at null.

Having thus disclosed my invention, I claim:

1. A control system for use in regulating a first condition relative to a second condition comprising a pair of sensing elements capable of sensing each condition and converting it into an electrical value, a bridge circuit for the sensing elements, means for placing the bridge circuit in an off-null condition, an amplifier receiving a signal from the bridge circuit, a thyristor receiving the amplified signal and being controlled by said signal, and a phase sensitive circuit including a pair of loops connected to said thyristor, each loop containing a relay and a diode, a center-tapped secondary transformer winding connecting said loops with the center tap leading to the thyristor, said thyristor providing a signal upon triggering that is in phase with one of the two loops to actuate the relay therein, the diode in the unactuated loop blocking actuation of the relay in the unactuated loop, said off-null condition of the bridge circuit producing a signal to trigger the thyristor and cause the loop in phase therewith to actuate the relay in the loop whereby corrective action may be initiated to drive the first condition to a point causing the thyristor to extinguish, deactivating the relay and whereby reverse corrective action may then be initiated to return the first condition to its former state.

2. A control system as set forth in claim 1, in which a relatively large change in the second condition being sensed by one of the sensing elements will cause the bridge circuit to pass through its balanced condition to the opposite side to a second off-null condition where a signal is generated in the opposite phase to trigger the thyristor and cause actuation of the opposite loop to actuate the relay whereby the first condition can be driven towards a balanced state by instituting a second corrective action.

3. A control system as set forth in claim 1, in which said thyristor acts as a switch to allow current flow in only one direction, a diode positioned across the gate of the thyristor to prevent triggering from a voltage reversal, and an additional diode in each loop positioned on the opposite side of the lead to the relay from the first-mentioned loop diode to prevent oscillations from the relay from causing false operation of the thyristor.

4. A control system as set forth in claim 1, in which said sensed condition is temperature and the temperatures of the sensing elements are slightly unequal with the bridge in its off-null condition, each loop of said phase-sensitive circuit operating independently, and solenoid valves controlling hot and cold water, the relay in one loop operating said solenoid valves for introducing alternate flows of hot and cold water to one of said sensing elements, thus causing continuous excursions above and below the point at which the temperature of the two sensing elements are equal.

5. A control system as set forth in claim 1, in which said sensing elements are thermistors which translate temperature change into resistance change, said bridge circuit comprising a wheatstone bridge having said thermistors in a pair of legs, a pair of resistors in the other two legs, an alternating current bias supply for the bridge, said means to place the bridge circuit in an off-null condition being a potentiometer located at the intersection of the legs containing said resistors, a lead from the potentiometer extending to said amplifier, and means to provide a constant voltage for said bridge circuit.

6. A control system as set forth in claim 5, in which said amplifier is a two-step amplification system employing a pair of transistors, and a diode bridge providing a direct current power supply for said amplifier.

7. A control system as set forth in claim 1, including a low-flow cold water solenoid valve, a low-flow hot water solenoid valve and a high-flow hot water solenoid valve, said relay in one loop actuating a switch arm between a normally closed contact actuating the low-flow hot water solenoid valve and a normally open contact which, when closed, actuates the low-flow cold water solenoid valve, and said relay in the opposite loop has a switch arm which, when the last-mentioned relay is actuated, closes a normally open contact actuating the high-flow hot water solenoid valve.

8. A control system as set forth in claim 7, in which said solenoid valves control hot and cold water flow to an adiabatic calorimeter having a bucket and a jacket, and said sensing elements comprise a pair of thermistors, one of which is positioned in the calorimeter jacket and the other is positioned in the calorimeter bucket.